United States Patent [19]

Maiden et al.

[11] Patent Number: 5,620,643
[45] Date of Patent: Apr. 15, 1997

[54] PROCESS FOR PRODUCING FUSED PARTICLE AGGLOMERATES

[75] Inventors: Joseph I. Maiden, Austin, Tex.; William A. Hendrickson, Houlton, Wis.; John T. Boden, White Bear Lake, Minn.

[73] Assignee: Minnesota Mining and Manufacturing Company, St. Paul, Minn.

[21] Appl. No.: 548,660

[22] Filed: Oct. 26, 1995

[51] Int. Cl.[6] ............................... B29B 9/08; B01J 2/16
[52] U.S. Cl. ..................... 264/117; 264/460; 23/313 R
[58] Field of Search ........................... 264/6, 12, 117, 264/460, 462; 23/313 R; 425/222

[56] References Cited

U.S. PATENT DOCUMENTS

| | | | |
|---|---|---|---|
| 3,443,959 | 5/1969 | Ciboit | 23/313 R |
| 3,548,782 | 12/1970 | Bergquist et al. | 264/117 |
| 4,259,053 | 3/1981 | Wahli | 425/222 |
| 4,345,015 | 8/1982 | Hendriksma et al. | 430/137 |
| 4,640,839 | 2/1987 | Hsu | 425/222 |
| 5,369,148 | 11/1994 | Takahashi et al. | 425/222 |

*Primary Examiner*—David A. Simmons
*Assistant Examiner*—Kenneth M. Jones
*Attorney, Agent, or Firm*—Gary L. Griswold; Walter N. Kirn; Darla P. Neaveill

[57] ABSTRACT

A method for forming agglomerated powder particles whereby powder particles absorb energy pulses emanating from a high intensity light source, which causes particles to soften to produce agglomerated powder particles by inter-particle contact, reducing the amount of fines, and producing agglomerated powder particles of increased average particle size, having smooth surfaces and improved flow characteristics for bulk powders.

11 Claims, 2 Drawing Sheets

PROCESS FOR PRODUCING FUSED PARTICLE AGGLOMERATES

BACKGROUND OF THE INVENTION

1. Field of the Invention

The invention relates to insulating resin powders useful for application to metal surfaces and to a method of forming agglomerated powder particles having improved coating properties and reduced dust generation during powder application.

2. Description of the Prior Art

Various methods of preparation of free-flowing powders are known, including suspension polymerization, spray drying, plasma spray and fluid bed processing. Types of powder formation for which these methods are particularly suitable are the formation of toner powders useful in imaging applications such as copiers and printers associated with computer equipment and formation of powders used to coat metal surfaces. Toner particles preferably are spherical particles having smooth surfaces; metal coating particles are preferably somewhat smooth, but not completely spherical.

The following powder formation methods are among those disclosed in the prior art. U.S. Pat. No. 4,345,015 discloses a method for forming spherical resin particles from irregularly shaped thermoplastic resin particles. Conductive carbon black either exists inside the resin particles or as a surface layer. A dispersion in a liquid carrier contains resin particles and silica particles to keep the resin particles separated. When the liquid is heated, the resin particles soften and adopt a spherical shape. Subsequent cooling, powder separation and drying yields a final toner product with such spherical shape.

German Patent DE 3533625 discloses a method of coating glass beads or bubbles with a synthetic resin powder. Essentially, a thermoplastic or thermosetting synthetic resin layer is deposited on the surface of the glass particles during heating of an intimate mixture of the glass particles and the resin. The coated particles provide lightweight molded structures suitable for further processing.

Chinese Patent CH 631635 discloses the formation of a spheroidal granulate by spray-drying of a composition of small particulates in a binder-containing solvent. Plasma flame treatment modifies the size thereof, producing free-flowing powders having desired particle size. Applications disclosed for the powders include metal surface coatings.

Canadian Patent CA 2005978 discloses attachment of a surface layer comprising a thermoset resin, preferably an epoxy resin mixture, to an inorganic or mineral filler such as quartz, mica, kaolin, etc. The coating process uses a fluid-bed mixer supplied with a combination of filler and thermoset resin powders. When the mixer is heated to a suitable temperature, the resin melts and deposits as a surface coating on the filler particles.

Japanese Patent JP 63319037 discloses surface modification of powders by means of a stream of hot air such that composite grains coated with fine particles form grains with a surface layer produced when the fine particles melt. Similar heated-air treatment of powders, revealed in Japanese patent JP 5011497, produces toner powder with less fine dust thereby improving surface charge stability and image quality. In this case, a precipitate, formed in a liquid medium, is isolated as a dry powder before heating. A stream of air operating for about one second at about 300° C. supplies sufficient heat to form a toner powder of desired characteristics.

These prior art disclosures require significant amounts of heat in order to effectively process the powder. In most cases, the process equipment is heated along with the powder products. If means existed for heating the powder without significantly heating the process equipment, cost reduction and process efficiencies result. The current invention provides such a means for heat treating powders to give smooth agglomerated particles with rounded surface features.

SUMMARY OF THE INVENTION

The invention provides agglomerated particles of controlled size distribution.

A preferred process for producing agglomerated particles comprising the following steps of:

a) introducing a meltable powder into a tubular processor, b) exposing the powder to pulsed energy from a high intensity light source thereby forming agglomerated particles, c) cooling the agglomerated particles and d) collecting the agglomerated particles as a free-flowing powder.

A useful powdered material is one which exhibits surface softening and resulting particle agglomeration under conditions developed in the processing equipment. Examples of suitable materials include filled or unfilled thermoplastic or thermoset resin compositions such as epoxy resin compositions, polyesters, polyamides, polyurethanes and polyolefins. When used as coatings for metal surfaces, untreated powders have a particle size range from about 2 μm to 200 μm. A typical untreated powder in this particle size range will contain significant amounts of undesirable, micro-fine, dust-forming particles. Removal of these dust-forming particles, by formation of agglomerates, improves both surface properties of the powder and appearance of coatings produced with processed compositions of the invention.

Equipment required for successful practice of the invention comprises a powder hopper, tubular processor, high intensity pulsed light source and a powder collector to contain the processed material.

Specifically, the process of the invention comprises the steps of placing a previously ground thermoplastic or thermoset resin into the entry chute or area of a quartz tubular processor. The powder then cascades downwards through the vertical entry portion of the tubular processor under the influence of gravity. As it enters the mouth of the tubular processor, the powder is contacted with energy from the high intensity light pulses, which causes an increase in the temperature of the powder, including large particles and smaller dust-forming particles. The energy absorption by the particles causes their surface to become tacky, and they begin to adhere to each other, forming larger agglomerates. Smaller particles attach themselves to larger particles thereby narrowing particle size distribution and reducing the concentration of dust-forming, micro-fine particles.

The pulsed energy transmitted into the tubular processor may originate from a single high-energy light source or from multiple light sources. In preferred embodiments, reflective structures around the light source direct as much energy as possible into the tubular processor. Adjustment of the light intensity and pulse-rate and the feed-rate of the powder through the processor affects the size, shape and temperature of the agglomerates formed. As the agglomerates emerge from the pulsed-light section of the tubular processor, they require cooling to harden the surface of the particles, thereby restricting clumping. The treated material is then collected as a free flowing powder.

The particle agglomeration not only results in free-flowing powders, but can also produce surface-modified particles when powders differing in composition pass together through a tubular processor equipped with flashlamp(s) as described. When dissimilar particles within mixed powders collide during flash processing they may form agglomerates combining the two compositions. If one of the compositional powders is in significant excess, that composition will dominate the surface of the powder agglomerates thereby providing coated particles having interior compositions of the powder present in lesser concentration.

DETAILED DESCRIPTION OF THE INVENTION

Powders and processes of the current invention provide improved ease of powder application and improved surface form, especially useful for powders used to coat metals, e.g., iron components of electrical motors. A valuable benefit of powders and processes of the invention is a significant reduction in the concentration of microfine particulates. Such particulates cause dust contamination at the coating site for metal components.

Compositions of the invention are first made into a pre-mix by use of conventional blenders, such as a "Littleford" blender to provide evenly dispersed compositions. The pre-mix is melt-mixed using a twin-screw extruder or a heated 2-roll mill. A preferred method of melt-mixing uses a co-rotating twin-screw extruder operating at temperature of from about 65° C. to about 120° C. Suitable commercially available equipment includes, e.g., an APV 30 mm extruder, with a length:diameter ratio from about 15:1 to about 30:1, available from APV Chemical Machinery Inc., Saginaw, Mich. Extruders of this type have a metering section, a feed section and a transition section and use screw mixing elements which are shaped from about 30° to about 90°. Various combinations of mixing elements are used to drive the melt through the extruder.

In addition, the extruder should comprise a transition section containing at least one reverse screw element, e.g. a 1–4 reverse 30° element. This element should be close to the extruder exit to assist in the control of residence time in the extruder. The extruder typically operates at screw speeds from about 125 rpm to about 350 rpm or as required to maintain a suitable electrical current load on the drive motor of the extruder and effectively mix the coating composition.

An ammeter displays the current load applied to the extruder motor. The display facilitates control of the equipment functions such as screw speed and material throughput. Auxiliary heating may be used to maintain desired temperatures. Optimum resin mixing results from careful selection of extruder screw configuration, screw speed, barrel temperatures and material residence time, factors which may be selected by a skilled artisan.

Figure 1:
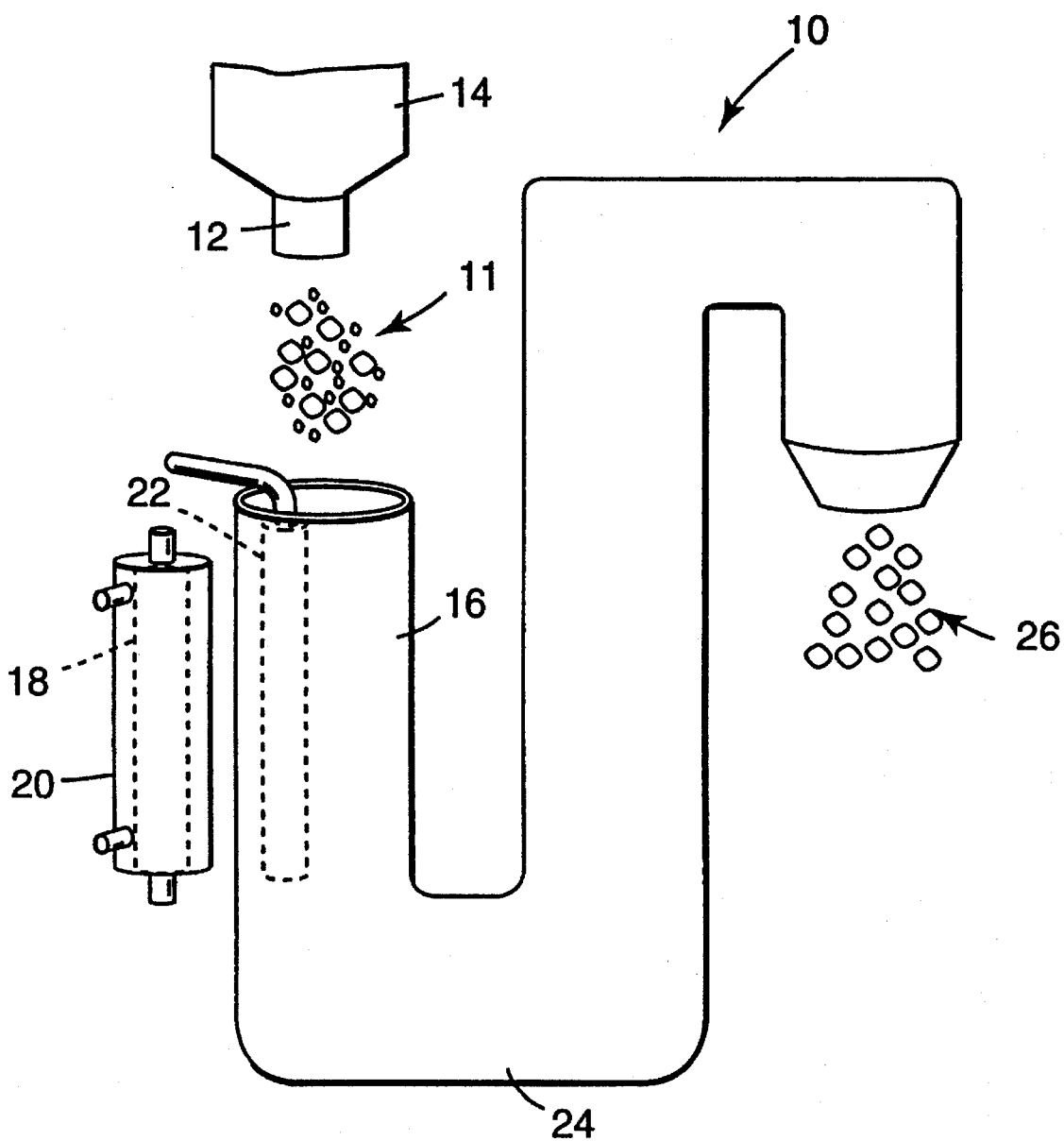
FIG. 1 is a schematic view of the process from introduction of the ground powder to collection of the agglomerated powder.

Material exiting the extruder collects in the form of a sheet which is cooled and ground to specification in a hammer mill. Processing aids such as fumed silica or alumina are introduced, again using e.g., a "Littleford" blender, to improve the flow characteristics of the powder. Thereafter, the ground powder is processed using the tubular quartz powder processor (10) of FIG. 1.

In discussion of the drawing, like numbers refer to the same parts associated with equipment used in the process of the invention. With respect to FIG. 1, ground powder (11) from the compounding operation drops, under the influence of gravity, from the nozzle (12) of a feed hopper (14) into a first portion (16) of the tubular powder processor (10). While quartz tubes are preferred, other tubes may be used, providing they are substantially transparent to the pulsed energy used to process powders passing through the first portion (16), i.e., the material used for the tubular processor should pass the energy through without substantially detracting therefrom.

Preferably this first portion is in vertical orientation but, if means for powder feed assist are included, the portion may be designed to operate in an orientation from horizontal to vertical. The ground powder (11) entering the processor (10) typically has a particle size distribution of about 2 μm to about 200 μm. As it traverses the first portion (16), the powder encounters energy transmitted through the walls of the quartz tube. The energy is emitted by a high intensity light source (18) surrounded by a cooling tranparent water jacket (20) and positioned outside the processor (10) with its longitudinal axis parallel to the first portion (16) of the processor (10).

A variety of arrangements of light sources (18) outside the processor provides a desirable concentration of energy within the first portion (16) of the processor (10). High energy density and high peak power density are required in the practice of the present invention. This can be accomplished by the use of a pulsed light source, such as a xenon flashlamp, to provide the required energy and power density.

Alternatively, the output of a continuous-wave light source may be focused down to a well defined volume to provide the necessary energy density, and a short transit time of the ground powder through this well defined volume provides the required peak power density.

After passing through the first portion (16) of the processor (10), the powder enters a cooling section (24) prior to exiting from the processor (10) as agglomerated particles (26).

Figure 2:
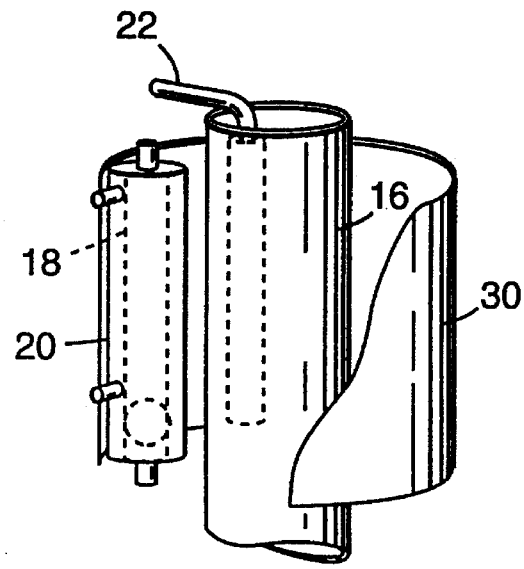
FIG. 2 is a detail drawing showing the use of a single light providing pulsed energy to the first section of the tubular processor.

FIG. 2 shows an arrangement using a single light source (18) combined with a cylindrical reflective element (30) that concentrates light reflecting from its surface through the cooling jacket (20) towards the center of the first portion (16). The high intensity light source is preferably a xenon flashlamp. Useful lamps include one available from ILC Technology Inc.,as Part #ILCT-18. This particular flash lamp comprises a quartz tube 30.5 cm long and 4.0 mm internal diameter filled with xenon at a pressure of 200 mm of Hg. Lamp operation requires a simmer current from about 1.0 amp to about 2.0 amps at capacitor charging voltages between about 5 kV and about 15 kV using a 2.2 µF capacitor.

Figure 3:
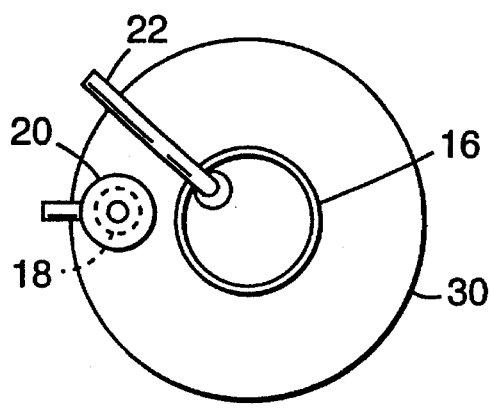
FIG. 3 is an end view of the entrance of the first section of the tubular processor.

FIG. 3 shows the concentric arrangement of the first portion (16) of the processor (10) relative to the reflector (30). The positioning of the light source (18) and its associated transparent water jacket (20) ensures that transmitted and reflected energy focuses towards the central axis of the first portion (16) of the processor.

Figure 4:
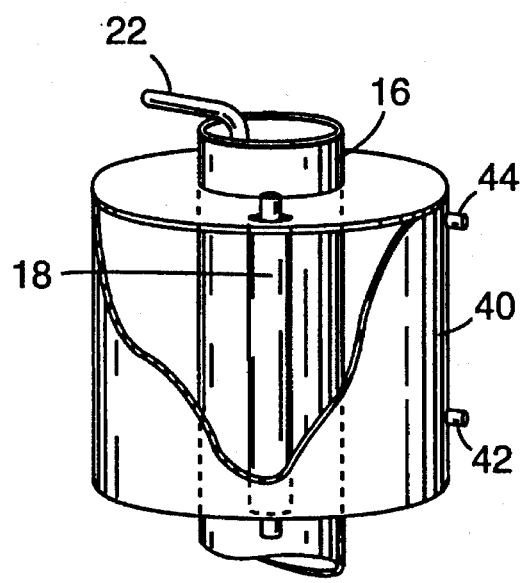
FIG. 4 is a detail drawing showing equipment for cooling both the light source and the first section of the tubular processor.

FIG. 4 provides an alternative arrangement for cooling the light source (18) and reflecting energy towards the central axis of the first portion (16) of the processor. In this case the transparent water jacket (40) encloses the first portion (16) and the single light source (18) so that water, passing between the jacket inlet (42) and outlet (44), circulates to cool both the light source and the tube (16). Water cooling of both components extends the useful process time period. A mirror coating may cover the outer surface of the transparent water jacket (40), to concentrate energy from the light source (18) towards the central axis of tube (16) in similar fashion to the reflector (30) used previously.

Figure 5:
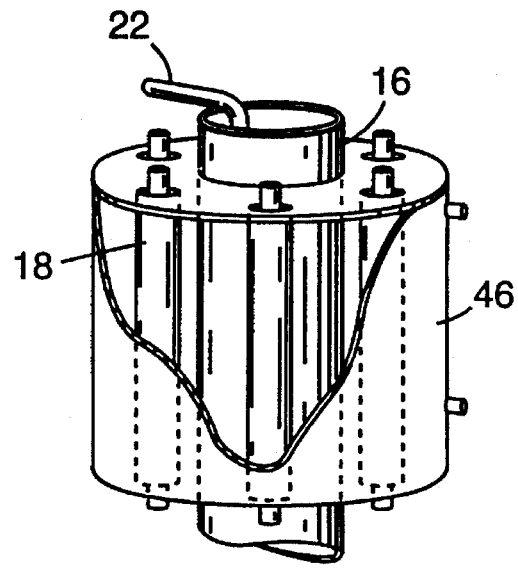
FIG. 5 is a detail drawing showing multiple light sources providing pulsed energy to the first section of the tubular processor.

FIG. 5 shows a transparent water jacket (46) designed to accommodate a cluster of flash lamps, each like the light source (18) previously described, at points equally spaced around the first portion (16) of the processor (10). The water jacket may also be supplied with a mirror coating which will reflect light towards the first portion (16) of the processor. This arrangement allows concentration of direct and reflected light towards the tube. In this embodiment, light entering the processor is more uniformly distributed because energy is emitted by multiple lamps encircling the quartz tube. The ground powder particles are therefore more uniformly exposed to the energy from the light source. Uniformity of exposure contributes to the consistency of the properties of the agglomerated powder particles obtained via the process of the invention. Continued exposure of the contents of the tubular processor (10) depends upon powder passing through the first portion (16) without clinging to the internal wall of the tube.

This condition is facilitated using an air-knife (22) to sweep the internal surface of the first portion of the processor preventing particle attachment to the wall. The air-knife also assists movement of the powder through the tubular processor (10). With the air-knife in operation, energy from the high-intensity flashlamp enters the processor unobscured.

Energy generated by the flashlamp is presented as a stream of pulses. Pulse duration is in the range of about 1 nanosecond to about 100 milliseconds. The energy emitted by the pulsed light source is absorbed by the ground particle surfaces resulting in heating of a portion of the particle. It is possible for very fine particles to melt fully. When short pulses, i.e., less than 1 millisecond, are employed with small particle diameters, i.e., less than 20 µm, it is likely that the entire particle volume heats to temperatures above the melting point of the composition. If larger diameter particles are used, i.e. greater than about 20 µm, or shorter pulses, i.e. less than about 1 millisecond, melting will occur only at the surface of the particle. When the surfaces are melted, inter-particulate collisions in the tube begin to cause formation of agglomerated particles. Small particles tend to attach to larger particles. This leads to a reduction in the relative amount of small particles and an increase in the average particle size of the agglomerated powder. Agglomerated particle development continues as long as the surface temperature is high enough for particles to adhere when colliding.

The length of the first portion of the processor influences the formation of agglomerates. Tube lengths from about 15 cms to about 30 cms for the first portion of the processor yield agglomerated particles having particle sizes of from about 9 µm to about 300 µm, which is suitable for motor iron coating applications.

The agglomerated particles produced by absorption of pulsed energy cool while passing into and through the second section (24) of the processor. This second section may be a horizontal tubular connection between the first and third sections of the processor.

Powder passing from the second section travels through the third section which terminates in a powder collector, e.g., a baghouse and cyclone. Movement of the powder through the tubular processor (10) may require air assist, applied in the first section (16) or vacuum assist at the powder collecter site. The design of equipment for moving powder from the first section to the powder collector may differ from that shown in FIG. 1. Since formation and cooling of agglomerated particles occurs primarily in the first section (16), any suitable means may be used to collect the treated, free-flowing powder (26).

FIG. 6 shows the change in particle size distribution occurring in the first portion (16) of the powder processor (10). Diagram A presents the size distribution of a powder before processing. When converted to a free-flowing powder of agglomerated particles, diagram B shows that the average particle size increases as does the size of the smallest particle detected.

Since the process generally provides larger particles by a mechanism of attachment of finer to larger particles, agglomerates of the invention may comprise larger core particles with a surface layer or shell of microfine particles. Careful selection of mixed powders containing particles of differing composition and particle size distribution allows production of particles having different core and surface layer compositions. This may be demonstrated through the use of different colored particles. For example, a mixture of yellow and blue powders appeared initially to be uniformly bluish green. A single pass through the agglomeration process changed the appearance with apparent separation of yellow particles that were visible to the unaided eye. With additional passes through the processor, the powder developed a more uniform greenish-blue color. This suggests attachment of finer yellow particles to larger particles with accompanying color modification when the underlying particle is blue.

The following, non-limiting examples provide processing conditions and physical characteristics of treated powders.

POWDER COMPOSITIONS

Powder formulations shown below are typical of the current invention.

| Composition 1 | |
| --- | --- |
| DER 667 (Dow Chemical Co.) | 28.04% |
| Epon ® 2004 (Shell Inc.) | 22.84% |
| Butyl terephthalate dianhydride | 14.21% |
| Wollastonite | 34.41% |
| 2-Methyl Imidazole | 0.50% |
| Composition 2 | |
| 3M aliphatic epoxy resin with 1000 equivalent weight | 76.30% |
| Epoxy phonolic curing agent, 3M | 15.29% |

-continued

| | |
|---|---|
| P101 (Shell Inc.) | 3.97% |
| Titanium Dioxide Titanox 2020 (Kronos) | 2.44% |
| Chrome Oxide (Sun Chemical) | 1.22% |
| Modaflow III (Monsanto) | 0.76% |

Composition 3

| | |
|---|---|
| Epoxy resin | 54.53% |
| (800 equivalent weight, 3M) | |
| Mineralite (Malvern Minerals) | 39.85% |
| Chrome Oxide (Sun Chemical) | 0.85% |
| Isophthalimide dihydrazide (IPDH) | 3.52% |
| Dicyanamide (DICY) | 0.84% |
| DMP-30 (Anchor Chemicals) | 0.40% |

Composition 4

| | |
|---|---|
| Crylcoat ® 320 (UCB Chemicals) | 78.15% |
| PT-810 (Ciba Geigy) | 15.62% |
| Butyl Terephthalate Dianhydride | 3.21% |
| Modiflow III (Monsanto) | 2.08% |
| Stannous Octoate | 0.37% |
| Cromethal Yellow (Ciba Geigy) | 0.37% |
| FC-430 (3M) | 0.71% |

Composition 5

| | |
|---|---|
| ECN 1280 (Ciba Geigy Corp.) | 24.00% |
| 3M Epoxy resin (800 equivalent weight) | 24.00% |
| Chrome Oxide (Sun Chemical) | 16.80% |
| Modiflow III (Monsanto) | 0.34% |
| N,N-Dimethylaniline | 0.05% |
| Diaminodimethylsulfone | 8.78% |
| Mineralite Mica (Malvern Minerals) | 19.25% |
| Titanium dioxide Titanox ® 2020 (Kronos, Inc.) | 5.65% |
| Stannous Octoate | 0.58% |
| Tetrahydroxyphthalic anhydride (THPA) | 0.58% |

Composition 6

| | |
|---|---|
| DER 667 (Dow Chemical Co.) | 10.66% |
| Epon 2004 (Shell Inc.) | 31.97% |
| Butyl terephthalate dianhydride | 11.67% |
| Wollastonite | 38.75% |
| 2-Methyl Imidazole | 0.06% |
| Titanox 2020 (Kronos, Inc.) | 65.32% |
| Pigment Blue 15 (Sun Chemical) | 3.97% |

Composition 7

| | |
|---|---|
| DER 667 (Dow Chemical Co.) | 10.66% |
| Epon 2004 (Shell Inc.) | 31.97% |
| Butyl terephthalate dianhydride | 11.67% |
| Wollastonite | 38.75% |
| 2-Methyl Imidazole | 0.06% |
| Titanox 2020 (Kronos, Inc.) | 65.32% |
| Chromophtal Yellow (Ciba Geigy Corp.) | 3.97% |

THE PRE-MIX PROCESS

Compositions of the invention are first made into a pre-mix to provide evenly dispersed compositions. The pre-mix is melt-mixed using a twin-screw extruder or a heated 2-roll mill. A preferred method of melt-mixing uses a co-rotating twin-screw extruder operating at temperature of from about 65° C. to about 120° C. Suitable commercially available equipment includes, e.g., an APV 30 mm extruder, with a length:diameter ratio from about 15:1 to about 30:1, available from APV Chemical Machinery Inc., Saginaw, Mich. Extruders of this type have a metering section, a feed section and a transition section and use screw mixing elements which are shaped from about 30° to about 90°. Various combinations of mixing elements are used to drive the melt through the extruder.

In addition, the extruder should comprise a transition section containing at least one reverse screw element, e.g. a 1–4 reverse 30° element. This element should be close to the extruder exit to assist in the control of residence time in the extruder. The extruder typically operates at screw speeds from about 125 rpm to about 350 rpm or as required to maintain a suitable electrical current load on the drive motor of the extruder and effectively mix the coating composition.

An ammeter displays the current load applied to the extruder motor. The display facilitates control of the equipment functions such as screw speed and material throughput. Auxiliary heating may be used to maintain desired temperatures. Optimum resin mixing results from careful selection of extruder screw configuration, screw speed, barrel temperatures and material residence time, factors which may be selected by a skilled artisan.

Material exiting the extruder collects in the form of a sheet which is cooled and ground to specification in a hammer mill. Processing aids such as fumed silica or alumina are introduced, again using e.g., a "Littleford" blender, to improve the flow characteristics of the powder. Thereafter, the ground powder is processed using the tubular quartz powder processor.

THE POWDER PROCESSOR

In a preferred embodiment, the powder processor comprises a quartz tube approximately 60 cm long, having an internal diameter of about 15 cm. The tube is positioned vertically inside a water jacket that has a mirrored surface and accommodates a xenon flashlamp 30.5 cm long and having a 4.0 mm internal diameter, to illuminate the tube with incident and reflected light. The lamp emits energy pulses of selected duration. For example, a lamp operating at a simmer current from about 1.0 amp to about 2.0 amps at capacitor charging voltages between about 5 kV and about 15 kV and emitting pulses in the range of about 10 to about 20 pulses per second, provides sufficient energy to generate heat to melt the surface of the resin powder.

An alternate arrangement comprises the quartz tube encircled by a number of xenon flashlamps, positioned between the quartz tube and the reflector coating on the outer wall of the water jacket to provide direct and reflected energy that illuminates the tube.

TABLE 1

OPERATING CONDITIONS FOR THE TUBULAR PROCESSOR

| Sample | Capacitor Volts (kV) | Flow Rate lbs/hr | Lamp Pulses/sec |
|---|---|---|---|
| Example 1 | 5.0 | 10.0 | 6.0 |
| Example 2 | 5.0 | 10.0 | 10.0 |
| Example 3 | 5.0 | 10.0 | 15.0 |
| Example 4 | 7.5 | 10.0 | 15.0 |
| Example 5 | 9.0 | 10.0 | 15 |
| Example 6 | 9.0 | 10.0 | 15 |
| Example 7 | 7.0 | 10.0 | 10 |
| Example 8 | 7.0–8.0 | 10.0 | 10 |
| Example 12 | 9.0 | 35–40 | 10 |
| Example 13 | 8.0 | 30 | 10 |
| Example 14 | 9.0 | 30 | 10 |
| Example 15 | 9.0 | 35–40 | 10 |
| Example 16 | 9.0 | 35–40 | 10 |
| Example 17 | 10.0 | 35–40 | 10 |
| Example 18 | 10.0 | 35–40 | 20 |
| Example 19 | 10.0 | 35–40 | 20 |

Note:
Ex. 12 = blue; Ex. 13 = Yellow 1; Ex. 14 = Yellow 2; Ex. 15 = B:Y 1; Ex. 16 = B:Y 2; Ex. 17 = B:Y 3; Ex. 18 = B:Y 4; Ex. 19 = B:Y 4 repeat

EXAMPLE 1

A thermoset epoxy powder according to Composition 1 was charged to the tubular processor at a rate of 10 pounds/ hour. The powder entered the agglomeration zone of the tubular processor and was exposed to energy from a xenon flashlamp operating at an energy level of 5 kV and emitting six (6) pulses per second. Under these conditions some rounding of individual particles was observed by microscopic inspection.

EXAMPLE 2

The tubular processor was operated as in Example 1 except that the lamp pulse rate was increased to ten (10) pulses per second. This change caused more effective rounding of the particles.

EXAMPLE 3

In a similar experiment to Example 1 the lamp pulse rate was set to fifteen (15) pulses per second. This input of additional heat further increased the quantity of rounded agglomerated particles.

EXAMPLE 4

Example 3 was repeated with the lamp energy changed from 5.0 kV to 7.5 kV. Particles collected after processing contained no microfine powder. The average particle size increased and the final shape of the agglomerated particles was close to spherical.

EXAMPLES 5–8

TABLE 2

POWDER PARTICLE SIZE BEFORE PROCESSING

| POWDER SAMPLE | PARTICLE SIZE (Percentiles) - Microns | | |
|---|---|---|---|
| | 10th | 50th | 90th |
| Example 5 | 27.26 | 62.21 | 117.50 |
| Example 6 | 10.40 | 39.74 | 110.89 |
| Example 7 | 9.97 | 32.03 | 71.01 |
| Example 8 | 21.95 | 59.91 | 144.76 |

TABLE 3

POWDER PARTICLE SIZE AFTER PROCESSING

| POWDER SAMPLE | PARTICLE SIZE (Percentiles) - Microns | | |
|---|---|---|---|
| | 10th | 50th | 90th |
| Example 5 | 28.10 | 71.28 | 129.30 |
| Example 6 | 16.25 | 56.68 | 118.57 |
| Example 7 | 21.73 | 51.64 | 102.46 |
| Example 8 | 29.95 | 65.82 | 129.8 |

Tables 2 and 3 show changes in particle size when processing Compositions 2–5 using the tubular powder processor of the invention. For examples 5 (Composition 2) and 6 (Composition 3) the lamp settings were 9.5 kV at 15 pulses per second. Processing terminated after one pass through the equipment.

After changing the lamp settings to 7.0 kV and 10 pulses per second energy output, example 7, described as composition 4 and Example 8, which comprised composition 5, cycled three times through the equipment. A final, single pass, treatment of example 8 required a lamp setting of 8.0 kV and 10 pulses per second.

EXAMPLES 9–19

TABLE 4

COLORED POWDER PARTICLE SIZE BEFORE PROCESSING

| POWDER SAMPLE | PARTICLE SIZE (Percentiles) - Microns | | |
|---|---|---|---|
| | 10th | 50th | 90th |
| Example 9 Blue | 11.49 | 66.30 | 201.44 |
| Example 10 Yellow | 16.51 | 64.87 | 135.37 |
| Example 11 B/Y | 16.82 | 65.64 | 158.35 |

Examples 9–19 (using Compositions 6, 7 or combinations thereof) provide evidence for varying the surface composition of agglomerated particles using the process of the invention. This is shown using colored powders. Examples 9–11 represent powders, prior to processing, that were blue, yellow and a 1:1 mixture of blue and yellow respectively. Careful observation of sample 11 revealed individual yellow and blue particles.

When subjected to flashlamp processing, according to the invention, these powders all showed typical reduction in the relative amount of small particles and a corresponding increase in the average particle size.

With the 1:1 mixture of blue and yellow particles, a change in color also occurred with multiple passes through the tubular processor.

The powder of example 15 resulted from a single pass of example 11 through the tubular processor. This example appears to exhibit an apparent increase in the amount of yellow particles. Subsequent additional passes represented by examples 16–18 caused more uniform color distribution.

The initial bluish-green color of example 11 passed through a color separation of example 15 then proceeded towards a more uniform greenish-blue color. This suggests that particle agglomeration provides coated particles having a surface layer of a different composition from the underlying particle. Thus it is possible to attach desired surface layers or multiple layers to a selected support particle.

TABLE 5

COLORED POWDER PARTICLE SIZE AFTER PROCESSING

| POWDER SAMPLE | PARTICLE SIZE (Percentiles) - Microns | | |
|---|---|---|---|
| | 10th | 50th | 90th |
| Example 12 Blue | 36.75 | 87.05 | 193.64 |
| Example 13 Yellow | 32.54 | 73.54 | 170.35 |
| Example 14 Yellow | 42.95 | 101.95 | 174.69 |
| Example 15 B/Y | 45.80 | 110.23 | 208.62 |
| Example 16 B/Y | 32.15 | 89.69 | 198.81 |
| Example 17 B/Y | 22.06 | 73.88 | 153.86 |
| Example 18 B/Y | 28.36 | 82.33 | 180.95 |
| Example 19 B/Y | 26.57 | 100.47 | 209.51 |

Particle size information was obtained using Microtrac® particle size analyzer available from Leeds & Northrop. The results clearly indicate that particles, after treatment, grew in size. This indicates achievement of particle agglomeration with its associated benefits of micro-fine powder removal, increase in yield of useful powder which affords lower cost because of waste reduction.

What is claimed is:

1. A process for producing a free-flowing powder of agglomerated particles of controlled size distribution comprising the steps of, a) introducing a powder into a tubular processor, b) exposing said powder to pulsed energy from a high intensity light source thereby forming said agglomerated particles, c) cooling said agglomerated particles and d) collecting said agglomerated particles as said free-flowing powder.

2. A process according to claim 1 wherein said powder is selected from the group consisting of polyesters, polyamides, polyurethanes, polyolefins and epoxy resins.

3. A process according to claim 1 wherein said tubular processor is a transparent quartz tube.

4. A process according to claim 1 wherein said high intensity light source comprises at least one xenon flash lamp.

5. A process according to claim 1 wherein said tubular processor is aligned vertically.

6. A process for producing a free-flowing powder of agglomerated particles, each said agglomerated particle having a surface layer composition and a core composition, said surface layer composition differing from said core composition, comprising the steps of, a) preparing a powder mixture comprising particles having a first composition and at least one added composition, said first composition differing from said added composition, b) introducing said mixed powder into a tubular processor, c) exposing said mixed powder to pulsed energy from a high intensity light source thereby forming said agglomerated particles having a surface layer formed over a core, said surface layer composition being different from said core composition, d) cooling said agglomerated particles e) collecting said agglomerated particles as said free flowing powder.

7. A process according to claim 6 wherein said mixed powder is from two or more members selected from the group consisting of polyesters, polyamides, polyurethanes, polyolefins and epoxy resins.

8. A process according to claim 6 wherein said tubular processor is a transparent quartz tube.

9. A process according to claim 6 wherein said high intensity light source comprises at least one xenon flash lamp.

10. A process according to claim 6 wherein said first composition have a first color and said added composition has a second color, said agglomerated particles having a third color.

11. A process comprising said steps according to claim 6, wherein said agglomerated particles are placed back into said tubular processor and subjected to each of said steps multiple times.

* * * * *